Figures 1, 2:
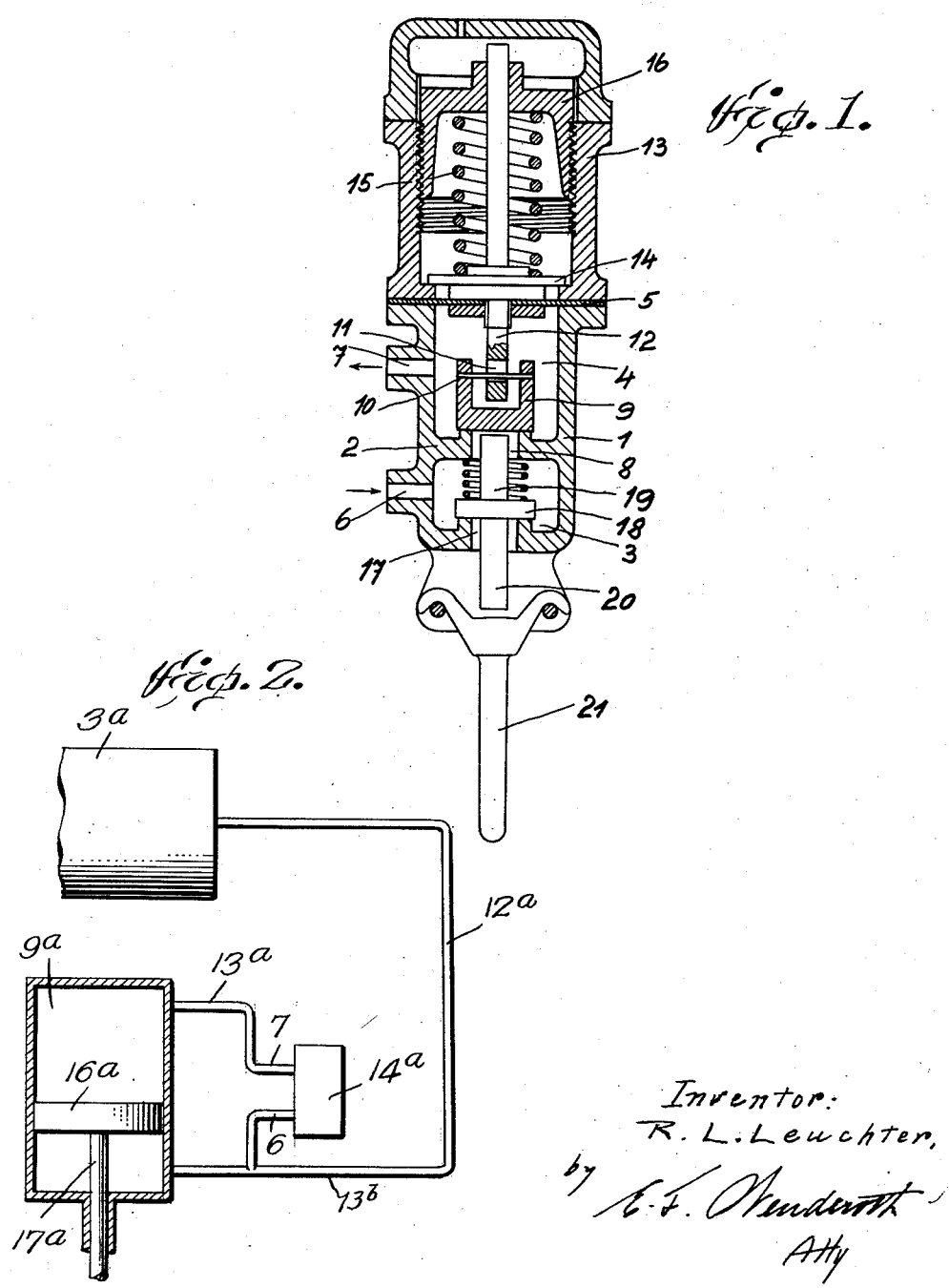

April 25, 1933.    R. L. LEUCHTER    1,906,165
PRESSURE RELEASE VALVE
Filed Jan. 21, 1931

Inventor:
R. L. Leuchter,
by
Atty

Patented Apr. 25, 1933

1,906,165

UNITED STATES PATENT OFFICE

RICHARD LUDWIG LEUCHTER, OF WEIDLINGAU-HADERSDORF, AUSTRIA, ASSIGNOR TO GEBRUDER HARDY, MASCHINENFABRIK UND GIESSEREI A. G., OF VIENNA, AUSTRIA, A CORPORATION OF AUSTRIA

PRESSURE RELEASE VALVE

Application filed January 21, 1931, Serial No. 510,252, and in Austria February 6, 1930.

This invention relates to pressure release valves for air pressure brakes of the Westinghouse type and more particularly to a release valve of the type disclosed in the prior United States Patent No. 1,755,962, and similar release valves.

In the drawing, Fig. 1 is an axial section of a constructional form of the present invention, and Fig. 2 is a diagrammatic view illustrating by way of example the application of the present invention to an air pressure brake plant of the Westinghouse brake type as set forth in the said prior United States Patent No. 1,755,962, only those parts of this plant being illustrated with which the present invention is concerned.

Referring to Fig. 2 the release valve of the air pressure brake plant comprises amongst other parts, with which the present invention is not concerned, a cylindrical chamber $9^a$ in which operates a piston $16^a$. The spaces of the chamber $9^a$ separated by the piston $16^a$ on a piston rod $17^a$ are connected with each other by a shunt or by path formed by pipes $13^a$, $13^b$, leading to the space above and below the piston $16^a$, respectively, and an automatic valve $14a$ adapted to be opened by hand whereby air under pressure is permitted to escape into the atmosphere from both sides of the piston $16a$ for equalizing the pressures on both sides of the piston, and fully releasing the brakes of an uncoupled vehicle to which the automatic valve $14a$ is associated. The pipe $13b$ is moreover permanently connected with a pipe $12a$ leading to the auxiliary reservoir $3a$ so that by opening the valve $14a$ by hand any excessive pressure in this auxiliary reservoir may be reduced.

The object of the present invention is to improve the construction and arrangement of the automatic valve hereinbefore referred to.

It will be noted that the numerals employed in Fig. 2 are substantially exactly the same as the corresponding numerals of Fig. 1 of the Leuchter Patent No. 1,755,962. Consequently, the relation of the schematic showing of Fig. 2 to the showing of Fig. 1 of the Leuchter patent can be readily followed.

In Fig. 1 the casing 1 of the automatic valve is divided by two compartments, 3 and 4, of which the upper compartment 4 is closed at its top by a diaphragm 5. Into the compartment 3 leads the duct 6 coming from the bottom space of chamber $9a$, Fig. 2 and from the auxiliary reservoir compartment 4 leads the duct 7 to the upper space of the chamber $9a$, Fig. 2. The partition 2 is provided with an opening 8, which is closed by the automatic valve 9 arranged in the compartment 4. A transverse rod 10 mounted on the automatic valve 9 passes through a hole 11 in the rod 12 mounted on the diaphragm 5. The diameter of the hole 11 is a multiple of the thickness of the transverse rod 10 so that the valve 9 may be raised in case of higher pressure in the compartment 3 that is to say, in the bottom space of the chamber $9a$, Fig. 2, and in the auxiliary reservoir $3a$.

The diaphragm 5 is secured between flanges on the casing 1 and counter flanges of a top part 13, and is connected with a disc 14 resting on an internal shoulder in the top part 13 and thereby limiting the downward movement of the diaphragm. Against the disc 14 bears a coiled spring 15 the other end of which bears against a plug 16 resembling a piston and screwed into the top part 13. By screwing up or down this plug the tension of the spring and its pressure exerted in the diaphragm may be nicely adjusted.

At the bottom of the compartment 3 is provided an opening 17 closed by a spring actuated automatic valve 18. On either side of the valve body 18 extend valve rods 19, 20 of which the one, when the valve 18 is closed, extends near up to the level of the seat of the valve 9 while the other valve rod extends to the outside of the valve casing and may be raised by a handle 21.

Whenever the pressure in the bottom space of the chamber $9a$ increases, the valve 9 is raised by an amount determined by the play of the transverse rod 10 in the hole 11. Whenever the pressure in the bottom space of the chamber $9a$ decreases the automatic valve closes and the pressure in both spaces of chamber $9a$ is maintained. But whenever the pressure in the upper space of the chamber 9a increases beyond a normal operating pressure to which the spring 15 is adjusted, the diaphragm is raised and the valve 9 is positively opened. If then the pressure in the bottom space of the chamber 9a and in the auxiliary reservoir decreases for any reason, air flows from the upper space of the chamber 9a through the valve 9, which is prevented from closing by the diaphragm and the rod 12 into the bottom space of the chamber 9a and into the auxiliary reservoir until the normal operating pressure is re-established in the upper space of the chamber 9a to which the spring 15 is adjusted, whereupon the diaphragm 5 returns into its normal position and the valve 9 can perform its normal function as an automatic valve.

If it is desired to bring about a release of the brakes by hand the valve 18 is raised by means of the handle 21 which after a slight idle movement raises the valve 9 by means of the rod 19 so that the air under pressure can escape into the atmosphere from the auxiliary reservoir and both spaces of the chamber 9a through the valves 9 and 18.

What I claim is:

1. In a pressure release valve the combination of a cylindrical chamber, a piston operating therein, an auxiliary reservoir permanently connected to the space on one side of the piston of the said chamber, an automatic valve adapted to establish connection between the auxiliary reservoir and the other space of the said cylindrical chamber, and means responsive to the air pressure existing in the said other space of the said cylindrical chamber and to a substantially constant force counteracting the said air pressure, for opening the said automatic valve whenever the air pressure in the said other chamber of the said cylindrical chamber overcomes the said substantially constant force.

2. In a pressure release valve the combination of a cylindrical chamber, a piston working therein, an auxiliary reservoir permanently connected to the space on one side of the piston of the said chamber an automatic valve adapted to establish connection between the auxiliary reservoir and the other space of the said cylindrical chamber, a diaphragm exposed on the one side of the air pressure existing in the said other space of the said cylindrical chamber and on the other side to the pressure of a counteracting spring, and means comprising a lost motion connection for connecting the said diaphragm to the said automatic valve.

3. In a pressure release valve the combination of a cylindrical chamber, a piston working therein, an auxiliary reservoir permanently connected to the space on one side of the piston of the said chamber, an automatic valve adapted to establish connection between the auxiliary reservoir and the other space of the said cylindrical chamber, means responsive to the air pressure existing in the said other space of the said cylindrical chamber and to a substantially constant force counteracting the said air pressure for opening the said automatic valve whenever the air pressure in the said other space of the said cylindrical chamber overcomes the said substantially constant force and an automatic escape valve arranged in shunt to the said automatic valve, and controlling the opening leading into the atmosphere, means for opening the said automatic escape valve, and means operatively connecting the said two automatic valves with each other.

4. In a pressure release valve the combination of a cylindrical chamber, a piston working therein, an auxiliary reservoir permanently connected to the space on one side of the piston of the said chamber, an automatic valve, a casing for the said automatic valve, the said casing comprising two compartments one of which is in permanently open connection with other space of the said cylindrical chamber and the other of which compartments is in permanently open connection with the auxiliary reservoir, a seat for the said automatic valve provided in the said partition, a spring actuated automatic escape valve in the said compartment connected with the auxiliary reservoir and controlling an opening leading into the atmosphere, means for opening the said automatic escape valve, and means comprising a rod secured to the said automatic escape valve for opening the first named automatic valve whenever the automatic escape valve is opened.

In testimony whereof I affix my signature at Vienna, Austria.

RICHARD LUDWIG LEUCHTER.